United States Patent
Retz et al.

(10) Patent No.: US 10,113,658 B2
(45) Date of Patent: Oct. 30, 2018

(54) PRESSURE LIMITING VALVE FOR A CRYOSTAT CONTAINING A CRYOGEN AND A SUPERCONDUCTING MAGNET

(71) Applicant: SIEMENS HEALTHCARE LIMITED, Camberley (GB)

(72) Inventors: Patrick William Retz, Witney (GB); Neil Charles Tigwell, Witney (GB)

(73) Assignee: Siemens Healthcare Limited, Camberley (GB)

( * ) Notice: Subject to any disclaimer, the term of this patent is extended or adjusted under 35 U.S.C. 154(b) by 67 days.

(21) Appl. No.: 15/301,015

(22) PCT Filed: Mar. 4, 2015

(86) PCT No.: PCT/EP2015/054537
§ 371 (c)(1),
(2) Date: Sep. 30, 2016

(87) PCT Pub. No.: WO2015/150009
PCT Pub. Date: Oct. 8, 2015

(65) Prior Publication Data
US 2017/0023142 A1    Jan. 26, 2017

(30) Foreign Application Priority Data
Apr. 3, 2014    (GB) .................................. 1406040.4

(51) Int. Cl.
*F17C 13/04*    (2006.01)
*F17C 3/00*    (2006.01)
(Continued)

(52) U.S. Cl.
CPC ........ *F16K 17/0413* (2013.01); *F16K 17/044* (2013.01); *F16K 17/08* (2013.01);
(Continued)

(58) Field of Classification Search
CPC . F16K 7/04; F16K 7/044; F16K 17/18; F16K 17/196; F16K 24/04; F17C 13/04;
(Continued)

(56) References Cited

U.S. PATENT DOCUMENTS 4,020,860 A * 5/1977 Fournier ................. F16K 17/14
137/69
5,094,084 A * 3/1992 Mraz ........................ F16J 13/24
220/89.1
(Continued)

FOREIGN PATENT DOCUMENTS

CN            87217202 U    12/1988
CN           203214985 U     9/2013
(Continued)

*Primary Examiner* — Frantz Jules
*Assistant Examiner* — Erik Mendoza-Wilkenfe
(74) *Attorney, Agent, or Firm* — Schiff Hardin LLP

(57) ABSTRACT

An abstract for a quench valve of a cryostat, in particular for use in a magnetic resonance imaging system, is attachable to the quench valve so as to raise the cracking pressure of the quench valve without changing the operability of the quench valve. Such an accessory device is usable to enable the cryostat, containing a cryogen, to be safely transported by air transportation.

5 Claims, 2 Drawing Sheets

(51) Int. Cl.
  *F16K 17/18* (2006.01)
  *F16K 24/04* (2006.01)
  *F16K 17/04* (2006.01)
  *F17C 13/00* (2006.01)
  *H01F 6/02* (2006.01)
  *F16K 17/08* (2006.01)

(52) U.S. Cl.
  CPC ............ *F17C 13/007* (2013.01); *F17C 13/04* (2013.01); *H01F 6/02* (2013.01); *F17C 2205/0332* (2013.01); *F17C 2270/02* (2013.01)

(58) Field of Classification Search
  CPC .... F17C 3/00; F17C 3/08; F17C 3/085; F17C 13/005; F17C 13/006; F17C 13/007; F17C 13/025; F17C 13/06; F17C 13/086; F17C 13/087; F17C 13/12; F17C 13/126; B65D 90/54; F25B 9/00; F25B 9/10; F25B 9/14; F25B 9/145; Y10T 137/7922; H01F 6/04; H01F 6/06
  See application file for complete search history.

(56) References Cited

U.S. PATENT DOCUMENTS

| | | | |
|---|---|---|---|
| 5,135,024 A * | 8/1992 | LeBlanc | B60K 15/0406 137/529 |
| 5,158,204 A | 10/1992 | Martrich et al. | |
| 5,861,126 A | 1/1999 | Bajolet | |
| 5,892,424 A | 4/1999 | Yamamoto et al. | |
| 6,305,412 B1 * | 10/2001 | Steele | F16K 17/196 137/493.4 |
| 2009/0145883 A1 | 6/2009 | Gentsch | |
| 2010/0102818 A1 | 4/2010 | Husband et al. | |
| 2011/0036101 A1 | 2/2011 | Tigwell et al. | |
| 2012/0174994 A1 | 7/2012 | Sorensen | |

FOREIGN PATENT DOCUMENTS

| | | | | |
|---|---|---|---|---|
| CN | 103557359 A | 2/2014 | | |
| DE | 19650752 C1 | 3/1998 | | |
| DE | 19827667 A1 | 12/1999 | | |
| GB | 2117494 A | 10/1983 | | |
| GB | 2468491 A * | 9/2010 | ............... | H01F 6/02 |
| GB | 2468491 A | 9/2010 | | |
| KR | 20110072610 A | 6/2011 | | |
| PL | 400180 A1 | 2/2014 | | |

* cited by examiner

PRIOR ART

PRESSURE LIMITING VALVE FOR A CRYOSTAT CONTAINING A CRYOGEN AND A SUPERCONDUCTING MAGNET

BACKGROUND OF THE INVENTION

Field of the Invention

This invention relates to an accessory device for a quench valve of a cryostat, in particular for use in a magnetic resonance imaging (MRI) system. Furthermore, this invention relates to a method of enabling a cryostat containing a cryogen to be safely transported by air transportation.

Description of the Prior Art

Superconducting magnet systems are used for medical diagnosis, for example in magnetic resonance imaging systems. A requirement of an MRI magnet is that it produces a stable, homogeneous, magnetic field. In order to achieve the required stability, it is common to use a superconducting magnet system which operates at very low temperature. The temperature is typically maintained by cooling the superconductor by immersion in a low temperature cryogenic fluid, also known as a cryogen, such as liquid helium.

The superconducting magnet system typically comprises a set of superconductor windings for producing a magnetic field, the windings being immersed in a cryogenic fluid to keep the windings at a superconducting temperature, the superconductor windings and the cryogen being contained within a cryogen vessel.

Superconducting magnets are susceptible to quench events, in which, for one of a number of reasons, part of the superconducting magnet ceases to be superconducting. The resulting resistance in part of the magnet causes heat due to the current flowing through it. This rapidly causes further parts of the superconducting magnet to cease superconducting. The result is that all of the energy which was stored in the magnetic field of the magnet is suddenly released as heat. In a superconducting magnet cooled by a liquid cryogen, this typically results in rapid boil-off of a large volume of the cryogen, with gaseous and liquid cryogen being expelled from the cryostat at high speed. During a quench, it is essential that the escaping cryogen gas is allowed to exit the cryostat in a safe manner. The exit point typically opens by responding to an increase in the pressure within the cryostat. It is known to provide a quench valve to control the exit point. The quench valve is closed until a certain pressure is reached within the cryostat. Once the cryostat pressure reaches the certain value, the quench valve is opened by the pressure acting upon it.

During transportation of an already assembled system, filled with cryogen, no cooling can be provided to the cryogen, which leads to a heat input into the cryostat, leading to a boil-off of cryogen. Therefore, during air transportation, relief devices must be available in order to guarantee a pressure-relief to protect against overpressure. In other words, a significant build-up of pressure within the cryostat shall be prevented.

However, the change of atmospheric pressure during an air shipment, even in a pressurized compartment, can cause a problem with the relief devices employed. Ordinary relief valves can freeze and plug up following rapid ejection of cold gas following altitude changes. For this reason, for air transportation, each magnet system has to be fitted with an absolute pressure relief valve, which is unaffected by atmospheric pressure. In addition, in order to comply with safety regulations, an independent second device has to be present, which second device can be a gauge device.

It is permissible to use the existing quench valve as the gauge device. However, the differential pressure required to crack the quench valve is less than the differential between the pressure within the magnet system and the pressure within the hold of the air craft during air transportation. Therefore, the quench valve would lift and vent excessive cryogen gas. In order to overcome this, it is known to blank off the outlet of the quench valve by an air tight plate fitted with e.g. a 13 PSIG valve. Additionally, a hand valve is fitted, which may also be used to relief pressure before removing the plate. The whole assembly needs to be leak tight and fully tested, making this an expensive solution. Furthermore, the assembly is discarded after arrival on operational site.

SUMMARY OF THE INVENTION

It is therefore an object of the present invention to provide a simple and reliable technique to ensure a safe air transportation of a cryostat containing a cryogen.

A core idea of the invention is to enable the existing quench valve of the cryostat to serve as a pressure-relief device during air transportation of the cryostat, in a way that the quench valve remains fully operable. In other words, the operating ability of the quench valve is not restricted. Merely the cracking pressure of the quench valve is temporarily raised for the purpose of air transportation. By this means, a safe air transportation of a cryostat containing a cryogen is achieved in a simple, reliable and very effective way, thereby following safety regulations.

Instead of removing parts of the existing quench valve, and installing an additional hand valve in case of air transportation, as is conventional in the prior art, the invention raises the valve cracking pressure in order to improve the capability of the existing quench valve. The cracking pressure of the quench valve is raised such that the expected differential pressure between the inside of the cryostat and the air craft hold is less than the raised cracking pressure. No additional valve is required. The accessory device, which is used for raising the cracking pressure of the quench valve, may be used several times.

DESCRIPTION OF THE PREFERRED EMBODIMENTS

Figure 1:
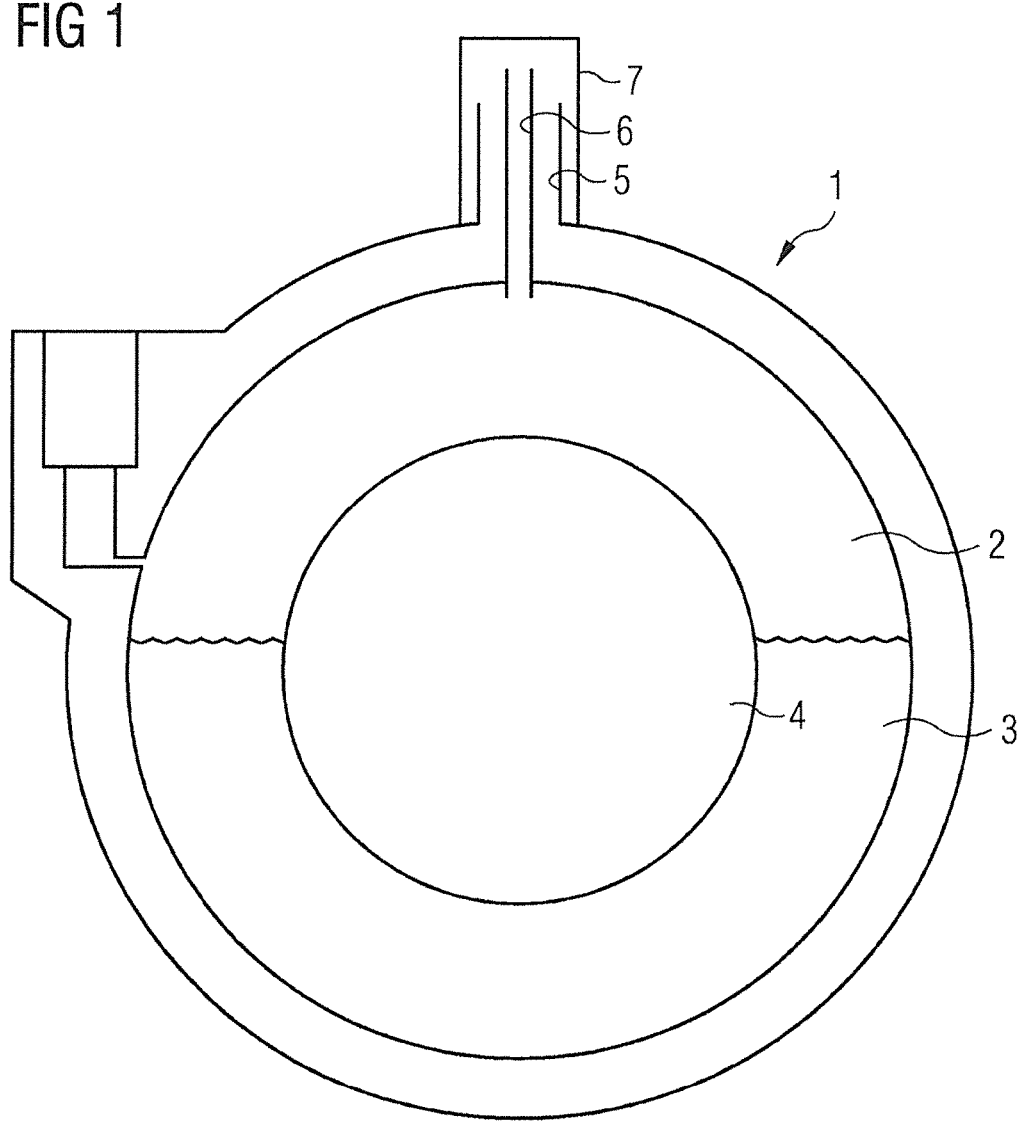
FIG. 1 shows a schematic illustration of a cryostat (prior art).

A cross-section of a superconducting magnet system for use in an MRI system is illustrated in FIG. 1. Superconductive magnet coils (not shown) are provided in a cryogen vessel 2 of a cryostat 1. The coils are immersed in a liquid cryogen 3, e.g. liquid helium. A central bore 4 is provided to accommodate a patient for examination. An access neck 5 with vent tube 6 is provided at the top of the cryostat 1 to allow access to the cryogen vessel 2. For clarity reasons, other parts of the cryostat 1, e.g. the refrigerator for providing active refrigeration to cool the cryogen 3, the outer vacuum chamber, or the thermal radiation shields, are not shown.

Figure 2:
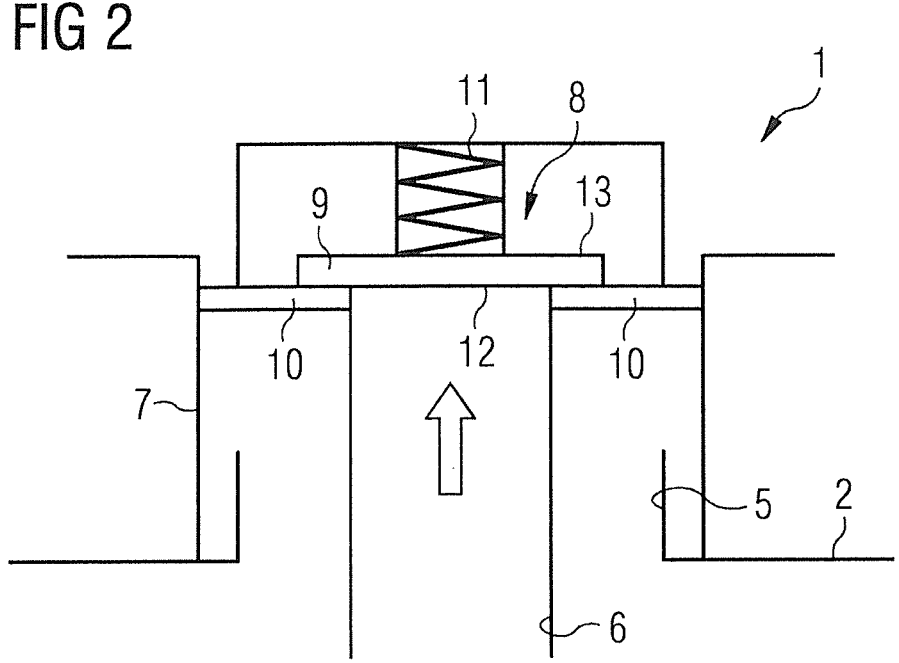
FIG. 2 shows a schematic illustration of a quench valve of the cryostat in a sectional view (prior art).

As illustrated in FIG. 2 in more detail, a turret outer assembly 7 encloses upper extremities of the access neck 5, and provides a normal exit path for cryogen gas from cryogen vessel 2. Turret outer assembly 7 is joined to the cryogen vessel 2 in a leak-tight manner and defines an interior volume which is separated from atmosphere by a protective valve and/or burst disc, in this case by a quench valve 8. The quench valve 8 is closed until a certain pressure is reached within the cryogen vessel 2. Once the cryostat pressure reaches the certain value, the quench valve 8 is opened by the pressure acting upon it.

Quench valve 8 includes a valve plate 9 which is held against valve seat 10 by a first spring arrangement 11. In case of overpressure within cryogen vessel 2, a corresponding pressure of cryogen gas acting on the inner side 12 of the valve plate 9 will exceed the pressure acting on the outer side 13 of the valve plate 9 sufficiently to overcome the force of the first spring arrangement 11 and open the quench valve 8. Cryogen gas will escape, maintaining the pressure within the cryogen vessel 2 at an acceptable level. Once the pressure in the cryogen vessel 2 drops below the pressure needed to keep the quench valve 8 open, first spring arrangement 11 will press the valve plate 9 back into contact with valve seat 10. Part of the valve plate 9 may be formed by a burst disc, not visible in FIG. 2 as it lies in the plane of the valve plate 9. In case the differential pressure across the valve plate 9 becomes much higher than the pressure at which the quench valve 8 should open, for example if the quench valve 8 sticks, or the pressure increase within the cryogen vessel 2 is extremely rapid or severe, the burst disc will rupture and cryogen gas will then escape through a hole left by the burst disc and out of the cryogen vessel 2. This burst disc is typically a declared regulatory pressure relief safety device, provided to rupture in the event of quench valve failure.

Figure 3:
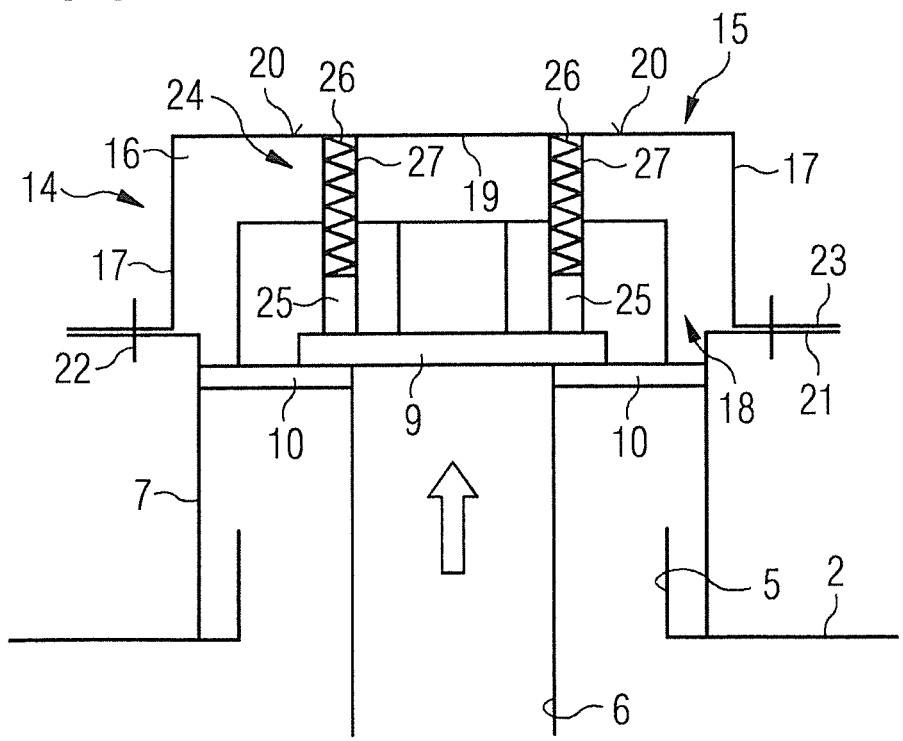
FIG. 3 shows a schematic illustration of a quench valve of the cryostat, according to the present invention, in a sectional view.

An embodiment of the invention is depicted in FIG. 3. The existing quench valve 8, as shown in FIG. 2, is modified prior to air shipment, without thereby loosing the valve operability of the quench valve 8. During modifying no part is removed from the quench valve 8. Instead, an accessory device 14 is installed to the quench valve 8, which temporarily raises the cracking pressure of the quench valve 8.

The accessory device 14 comprises a main body 15 forming a cylindrical or box-shaped container 16 with walls 17, with an open front 18 and a back plate 19. The main body 15 is provided with a number of small vent holes, which serve as openings to allow cryogen gas originating from the quench valve 8 to escape from the container 16 in case of a quench. An exemplary position of the vent holes is indicated in FIG. 3 by arrow 20. The main body 15 is fitted to the outer flange 21 of the quench valve 8 by means of removable fastening elements 22, e.g. screws. For this purpose, the front end of the main body 15 is extended to form mounting flanges 23.

The back plate 19 is arranged parallel to the valve plate 9 of the quench valve 8, when the accessory devices 14 is mounted. A second spring arrangement 24 comprising four spring-loaded plungers 25 is provided within the container 16. In FIG. 3 only two plungers 25 are illustrated. The plungers 25 bear on the valve plate 9, by this means raising the cracking pressure of the quench valve 8. The second spring arrangement 24 comprises four spring elements 26 in the form of compression springs. The spring elements 26 are employed to act on the plungers 25, in order to provide the spring load, as required. The back plate 19 of the main body 15 acts as counter bearing for the spring elements 26. For each spring element 26 an internal guiding rod 27 is provided. All guiding rods 27 are mounted to the back plate 19 of the main body 15.

By means of the accessory device 14, using the second spring arrangement 24, the cracking pressure of quench valve 8 may be raised for example from 6 to 13 PSIG. In case of overpressure during air shipment, the pressure of cryogen gas acting on the inner side 12 of the valve plate 9 has to overcome the force of the second spring arrangement 24 in order to open the quench valve 8. In this event, cryogen gas exits the cryogen vessel 2 and enters the container 16, from which the gas escapes through the number of small vent holes.

When mounted, the main body 15 of the accessory device 14 is adapted to serve as a protective enclosure both for the first and second spring arrangement 11, 24, as well as for the surroundings of the cryogen vessel 2 in case of a rupture of a burst disc.

On arrival in the hospital or any other operational site, the accessory device 14 is removed, bringing the quench valve 8 back into its normal operation mode.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A pressure limiting valve for a cryostat that contains a cryogen and a superconducting magnet, said cryostat having a vent tube with a vent tube opening, said pressure limiting valve comprising:
   a quench valve comprising a single valve plate seated in a valve seat that surrounds said vent tube opening, and a first spring arrangement comprising a spring that produces a spring bias that urges said single vent plate against said valve seat so as to allow a cryogen gas, produced upon occurrence of a quench, to escape through said vent opening when a cracking pressure of said cryogen gas exceeds said spring bias produced by said spring of said first spring arrangement;
   a cracking-pressure-raising assembly temporarily fitted over said quench valve;
   said cracking-pressure-raising assembly comprising a main body that is non-destructively removably attached, by manually removable fastener elements, to said quench valve or to said cryostat; and
   said cracking-pressure-raising assembly comprising a second spring arrangement, comprised of a plurality of spring elements that together produce a further spring bias applied to said single valve plate in addition to said spring bias produced by said spring of said first spring arrangement, with said main body forming a counter bearing for said plurality of spring elements of said second spring arrangement, so as to temporarily raise the cracking pressure needed to allow said cryogen gas to escape through said vent opening as long as the cracking-pressure-raising assembly is fitted over said quench valve.

2. A method of enabling a cryostat to be safely transported by air transportation, said cryostat containing a cryogen and a superconducting magnet, said cryostat having a vent tube with a vent tube opening, and said cryostat comprising a quench valve comprising a single valve plate seated in a valve seat that surrounds said vent tube opening, and a first spring arrangement that produces a spring bias that urges said single vent plate against said valve seat so as to allow a cryogen gas, produced upon occurrence of a quench, to escape through said vent opening when a cracking pressure of said cryogen gas exceeds said spring bias produced by said first spring arrangement, said method comprising;

temporarily fitting a cracking-pressure-raising assembly over said quench valve by non-destructively removably attaching a main body of said cracking-pressure-raising assembly with manually removable fastener elements to said quench valve or to said cryostat, said cracking-pressure-raising assembly comprising a second spring arrangement comprising a plurality of spring elements; and using said plurality of spring elements of the second spring arrangement of said cracking-pressure-raising assembly to produce a further spring bias applied to said single valve plate in addition to said spring bias produced by said first spring arrangement, with said main body forming a counter bearing for said plurality of spring elements of said second spring arrangement, and thereby temporarily raising the cracking pressure needed to allow said cryogen gas to escape through said vent opening as long as the cracking-pressure-raising assembly is fitted over said quench valve.

3. The pressure limiting valve as claimed in claim 1, wherein the cracking-pressure-raising assembly further comprises at least one of said spring elements of said second spring arrangement has a plunger that is spring-loaded by said at least one of said plurality of spring elements of said second spring arrangement so as to participate in applying said further spring bias to said single valve plate.

4. The pressure limiting valve as claimed in claim 3, wherein the main body of the cracking-pressure-raising assembly encloses at least one of the spring elements of said second spring arrangement, and the first spring arrangement.

5. The pressure limiting valve as claimed in claim 1, wherein the main body of the cracking-pressure-raising assembly comprises a plurality of openings forming vent holes.

\* \* \* \* \*